(12) United States Patent
Seewald et al.

(10) Patent No.: US 11,941,710 B2
(45) Date of Patent: Mar. 26, 2024

(54) BEHAVIORAL MODELING FOR POWER UTILITY AUTOMATION NETWORKS

(71) Applicant: Cisco Technology, Inc., San Jose, CA (US)

(72) Inventors: Maik Guenter Seewald, Nuremberg (DE); Laurent Jean Charles Hausermann, Lyons (FR); André Guérard, Saint Etienne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 299 days.

(21) Appl. No.: 17/148,934

(22) Filed: Jan. 14, 2021

(65) Prior Publication Data

US 2022/0222755 A1    Jul. 14, 2022

(51) Int. Cl.
*G05B 17/02* (2006.01)
*G06Q 50/06* (2012.01)
*H02J 13/00* (2006.01)

(52) U.S. Cl.
CPC ............ *G06Q 50/06* (2013.01); *G05B 17/02* (2013.01); *H02J 13/00028* (2020.01)

(58) Field of Classification Search
CPC .... G05B 17/02; G06Q 50/06; H02J 13/00028
See application file for complete search history.

(56) References Cited

U.S. PATENT DOCUMENTS

| | | | |
|---|---|---|---|
| 10,452,845 B2 | 10/2019 | Mestha et al. | |
| 2014/0058689 A1* | 2/2014 | Klien | H04L 63/14 |
| | | | 702/60 |
| 2016/0218949 A1* | 7/2016 | Dasgupta | G06F 11/3409 |
| 2017/0099310 A1* | 4/2017 | Di Pietro | H04L 63/1425 |
| 2018/0152467 A1* | 5/2018 | Anderson | H04L 63/1425 |
| 2022/0201026 A1* | 6/2022 | Wen | G06N 3/0454 |

FOREIGN PATENT DOCUMENTS

| | | |
|---|---|---|
| CN | 109586282 | 4/2019 |
| CN | 109902740 | 6/2019 |

OTHER PUBLICATIONS

Jarmakiewicz, et al., "Cybersecurity Protection for Power Grid Control Infrastructures", International Journal of Critical Infrastructure Protection, vol. 18, Sep. 2017, 36 pages.

(Continued)

*Primary Examiner* — Yuhui R Pan
(74) *Attorney, Agent, or Firm* — BEHMKE INNOVATION GROUP LLC; James M. Behmke; Keith O. Mitchell

(57) ABSTRACT

According to one or more embodiments of the disclosure, a device obtains one or more System Configuration Description Language files regarding a power utility automation network. The device also obtains traffic data regarding traffic in the power utility automation network. The device trains, using the one or more System Configuration Description Language files and the traffic data, a behavioral model for the power utility automation network that models traffic in the power utility automation network. The device initiates use of the behavioral model in the power utility automation network to identify anomalous traffic behavior in the power utility automation network.

19 Claims, 5 Drawing Sheets

(56) References Cited

OTHER PUBLICATIONS

Premaratne, et al., "Possibilistic Decision Trees for Intrusion Detection in IEC61850 Automated Substations", 2009 International Conference on Industrial and Information Systems (ICIIS), Dec. 2009, IEEE.
Yang, et al., "Intrusion Detection System for IEC 61850 Based Smart Substations", 2016 IEEE Power and Energy Society General Meeting (PESGM), Jul. 2016, 5 pages, IEEE.
"OPC Foundation Announces IEC 61850 Companion Spec Release", Apr. 2018, 4 pages, opcconnect.opcfoundation.org, OPC Foundation.
"OPC Unified Architecture", online: https://en.wikipedia.org/wiki/OPC_Unified_Architecture, Nov. 2020, 7 pages, Wikimedia Foundation, Inc.
"Substation Configuration Language", online: https://en.wikipedia.org/wiki/Substation_Configuration_Language, Nov. 2019, 2 pages, Wikimedia Foundation, Inc.
"IEC 61850", online: https://en.wikipedia.org/wiki/IEC_61850, Jan. 2020, 4 pages, Wikimedia Foundation, Inc.
"Introduction to the IEC 61850 Protocol", online: https://www.ensotest.com/iec-61850/introduction-to-iec-61850-protocol, 2019, 8 pages, Ensotest S.L.

\* cited by examiner

BEHAVIORAL MODELING FOR POWER UTILITY AUTOMATION NETWORKS

TECHNICAL FIELD

The present disclosure relates generally to computer networks, and, more particularly, to behavioral modeling for power utility automation networks.

BACKGROUND

Power utility automation networks, such as those found in substations for electric utilities, need robust cyber security controls to protect critical installations. Indeed, infiltration of these types of networks by a malicious entity can result in power outages, equipment damage, or the like.

Cybersecurity efforts to protect power utility automation networks have typically relied on leveraging mechanisms used to protect traditional networks. For instance, many power utility automation networks rely on the deployment of firewalls, signature-based intrusion prevention system (IPS) and/or intrusion detection system (IDS) mechanisms, and the like, to inspect Layer-2 and Layer-3 traffic. A certain form of malware, for instance, may generate network traffic that exhibits a very specific signature.

Signature-based approaches to cybersecurity can be quite effective at detecting known forms of malware. However, these approaches also fundamentally require there to be knowledge of the behavior of the malware, beforehand, so that a signature of its behavior can be generated. This means that there is a persistent risk of a new form of malware infiltrating the network before its signature can be pushed to the cybersecurity mechanisms of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
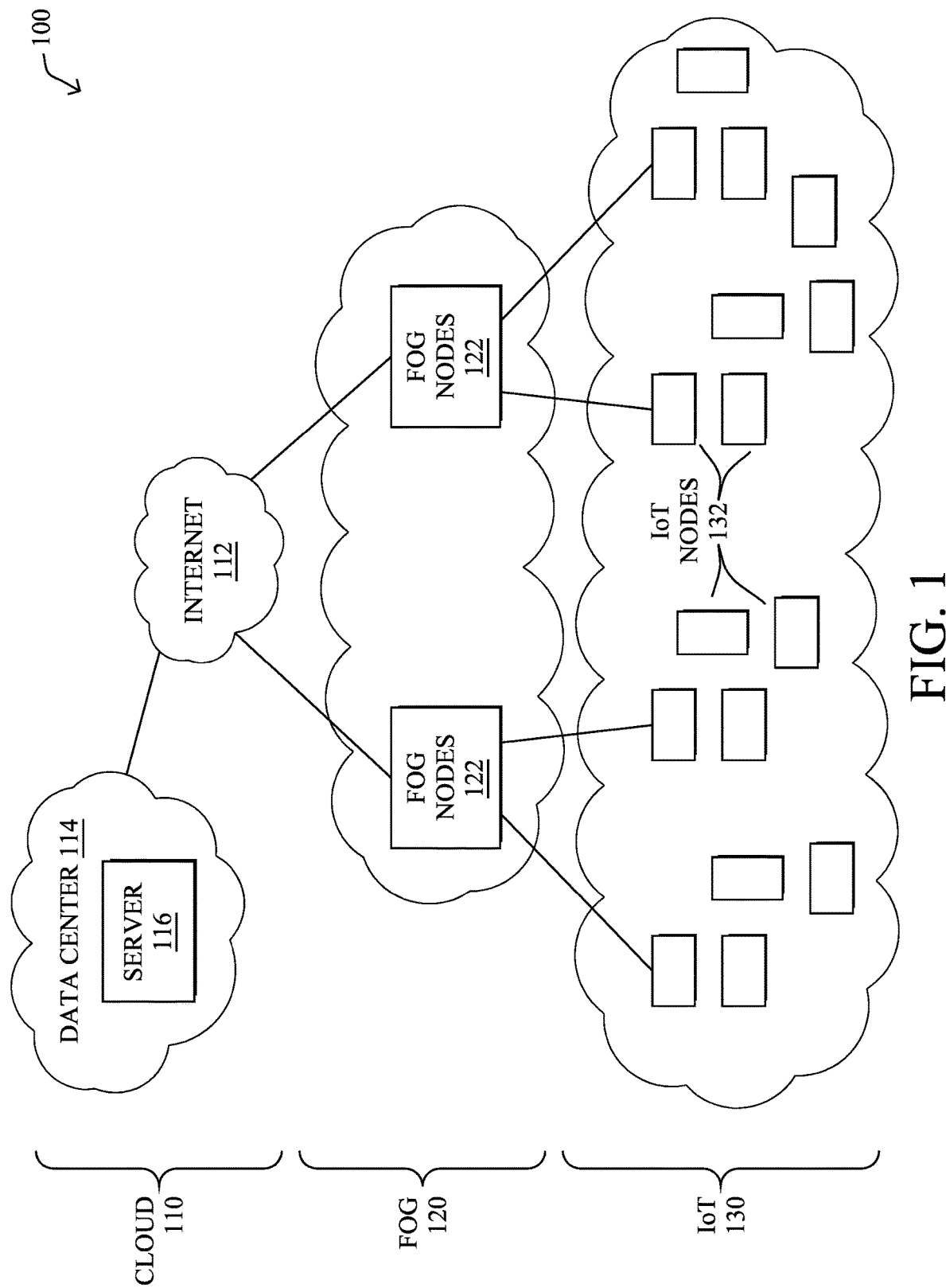
FIG. 1 illustrates an example network.

According to one or more embodiments of the disclosure, a device obtains one or more System Configuration Description Language files regarding a power utility automation network. The device also obtains traffic data regarding traffic in the power utility automation network. The device trains, using the one or more System Configuration Description Language files and the traffic data, a behavioral model for the power utility automation network that models traffic in the power utility automation network. The device initiates use of the behavioral model in the power utility automation network to identify anomalous traffic behavior in the power utility automation network

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
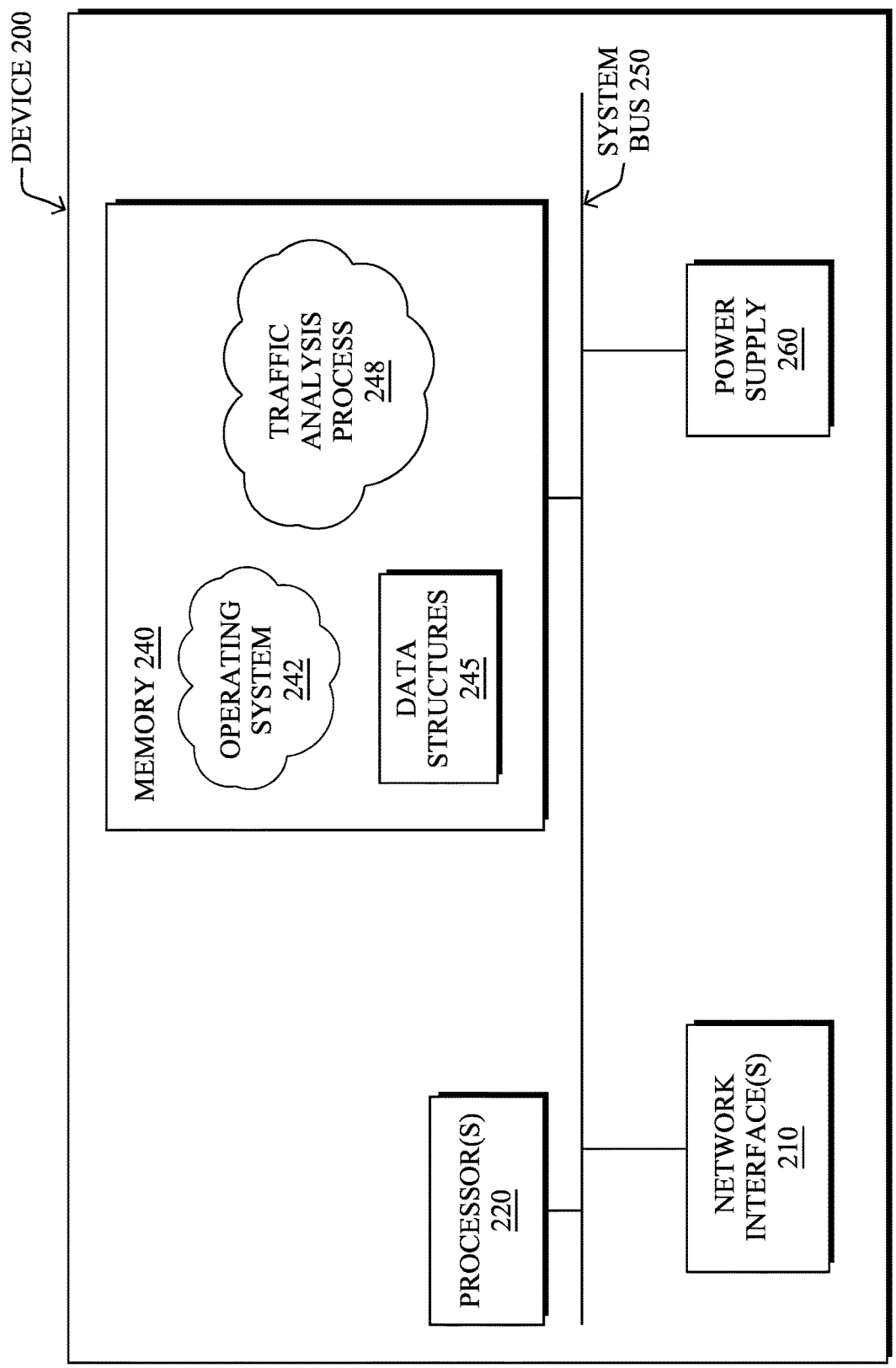
FIG. 2 illustrates an example network device/node.

FIG. 2 is a schematic block diagram of an example node/device 200 that may be used with one or more embodiments described herein. For instance, node/device 200 may take the form of a wireless access point, a controller for a wireless access point, a mobile client, or another device in communication therewith (e.g., a switch, a router, a server, etc.). As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, traffic analysis process 248 may be configured to analyze captured telemetry data regarding traffic in a network. To do so, in some embodiments, traffic analysis process 248 may leverage machine learning techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include traffic data that has been labeled as 'normal' or 'anomalous.' On the other end of the spectrum are unsupervised techniques that do not require a training set of labels. Notably, while a supervised learning model may look for previously seen patterns that have been labeled as such, an unsupervised model may instead look to whether there are sudden changes in the behavior that may be deemed anomalous. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, deep learning networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest or other decision tree-based classification, or the like.

The performance of a machine learning model can be evaluated in a number of ways based on the number of true positives, false positives, true negatives, and/or false negatives of the model. For example, consider the case of a machine learning model that has been trained to determine whether traffic behavior in a network is normal or anomalous. In such a case, the false positives of the model may refer to the number of times the model incorrectly determined that the traffic behavior was anomalous. Conversely, the false negatives of the model may refer to the number of times the model incorrectly predicted that the traffic behavior was normal. True negatives and positives may refer to the number of times the model correctly identified the traffic behavior as being normal or anomalous, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, power utility automation networks, such as those found in utility substations, require robust cybersecurity mechanisms to protect against malicious entities. Traditionally, such networks rely on cybersecurity measures that originated for use in classical networks. For instance, many power utility automation networks today use firewalls, signature-based intrusion prevention system (IPS) and/or intrusion detection system (IDS) mechanisms, and the like, to inspect Layer-2 and Layer-3 traffic. However, a signature-based approach to cybersecurity also opens up the possibility for previously unseen forms of attacks and malware to infiltrate a network.

A key observation herein is that power utility automation networks are well-defined networks, in contrast to more traditional networks. Indeed, standards such as the International Electrotechnical Commission (IEC) 61850, have standardized how components of the system are described. More specifically, System Configuration Description Language (SCL) files, as specified by IEC 61850, are often used in power utility automation networks to provide a data representation of a substation and its components.

Thus, an opportunity exists to leverage SCL files and other information about a power utility automation network, to form a behavioral model of the network. Any deviation from the expected behavior of the network, then, could be an indication of a cybersecurity threat. In other words, rather than looking for behavioral patterns/signatures associated with specific types of threats, any deviation from how the network is expected to operate could be used to identify a threat, instead. This is particularly of benefit in the case of zero-day attacks, where the type of threat was previously unknown and exhibits a behavior that does not match any existing signatures.

Behavioral Modeling for Power Utility Automation Networks

The techniques introduced herein leverage domain-specific engineering data, such as SCL files and the like, to construct a behavioral model of a power utility automation network. Once the model is trained, the network can use this model to detect anomalous behaviors in the power utility automation network, allowing for the early detection of zero-day attacks and other cybersecurity threats.

Illustratively, the techniques described herein may be performed by hardware, software, and/or firmware, such as in accordance with traffic analysis process 248, which may include computer executable instructions executed by the processor 220 (or independent processor of interfaces 210) to perform functions relating to the techniques described herein.

Specifically, according to various embodiments, a device obtains one or more System Configuration Description Language files regarding a power utility automation network. The device also obtains traffic data regarding traffic in the power utility automation network. The device trains, using the one or more System Configuration Description Language files and the traffic data, a behavioral model for the power utility automation network that models traffic in the power utility automation network. The device initiates use of the behavioral model in the power utility automation network to identify anomalous traffic behavior in the power utility automation network.

Figure 3:
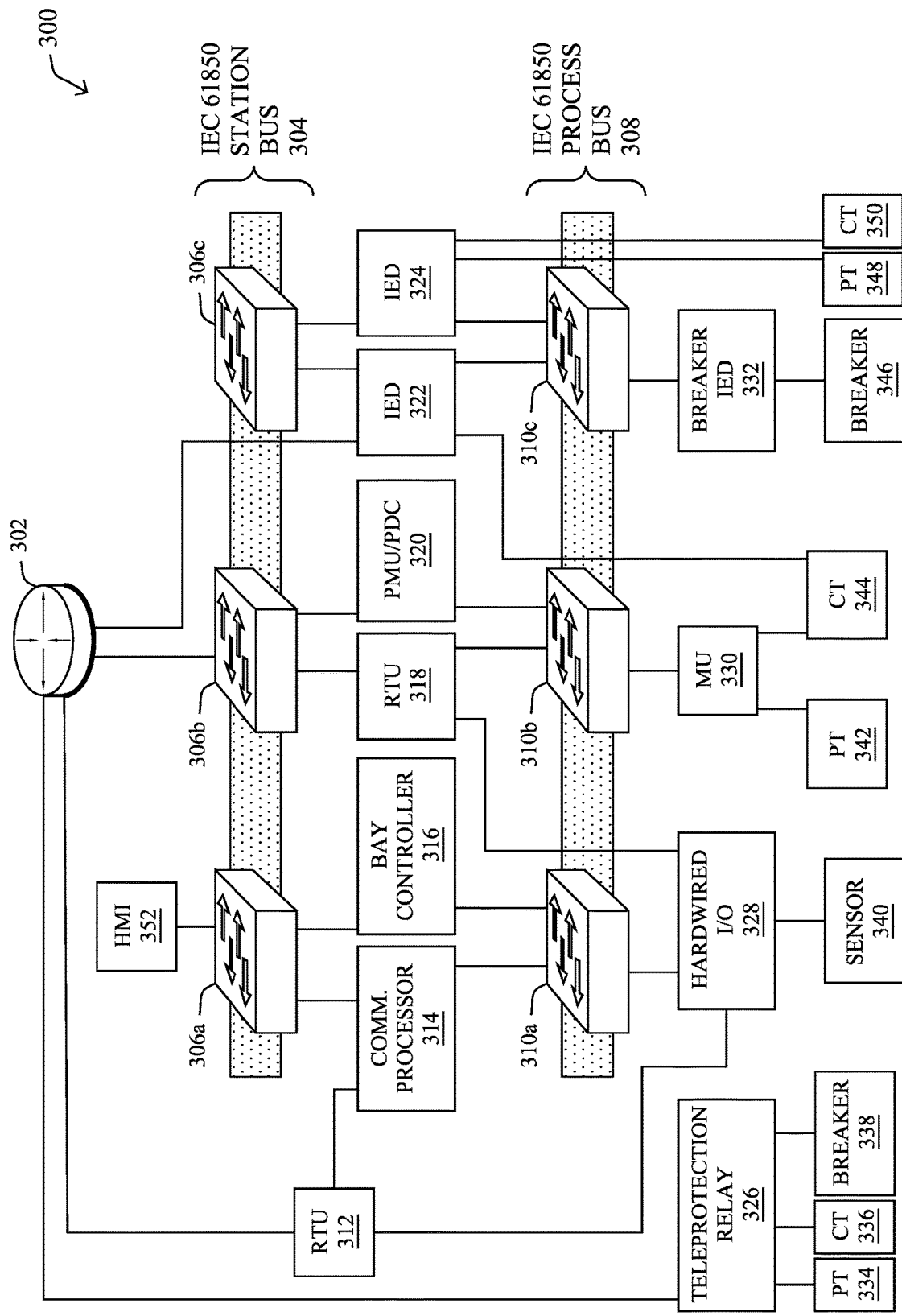
FIG. 3 illustrates an example power utility automation network.

Operationally, FIG. 3 illustrates an example power utility automation network 300, according to various embodiments. Power utility automation network 300 represents a typical network for a power utility substation. As shown, power utility automation network 300 may comprise networking equipment such as a router 302, an IEC 61850 station bus 304 comprising any number of switches 306 (e.g., switches 306*a*-306*c* shown), and an IEC 61850 process bus 308 comprising any number of switches 310 (e.g., switches 310*a*-310*c* shown). As would be appreciated, power utility automation network 300 is intentionally simplified for purposes of describing the techniques herein and a deployed power utility automation network may include different configurations, device types, or the like, to which the techniques herein could equally apply.

Connected to the networking equipment of power utility automation network 300 may be any number of endpoints, such as the equipment responsible for measuring the power that the substation receives and distributes. For instance, power utility automation network 300 may include any or all of the following equipment:

Potential transformers (PTs)—these devices are used to measure the potential/voltages on the lines of the substation. Typically, a PT will scale down the high voltage on the line for input to its measuring circuitry, to prevent damage to the circuitry (e.g., by scaling down a line voltage of 110 kV to 5V, etc.). For instance, power utility automation network 300 may include PTs 334, 342, and 348 as endpoints, as shown.

Current transformers (CTs)—these sensors are used to measure the currents on the lines of the substation. Similar to the operation of a PT, a CT will typically step down the high current on the line to a manageable current for consumption by its measurement circuitry. For instance, power utility automation network 300 may include CTs 336, 344, and 350 as endpoints, as shown.

Phasor measurement units (PMUs)/phasor data concentrators (PDCs)—these sensors are configured to measure the magnitudes and phase angles of the electricity flowing through the substation. For instance, power utility automation network 300 may include PMU/PDC 320.

Circuit breakers—a circuit breaker generally functions to protect the substation and its equipment from damage by opening a circuit in the presence of an error, such as short circuits, overloads, etc. For instance, as shown, power utility automation network 300 may include circuit breakers 338 and 346.

Control devices—as would be appreciated, power utility automation network 300 may also include any number of control devices such as remote terminal units (RTUs) (e.g., RTUs 312, 318), intelligent electronic devices (IEDs) (e.g., IEDs 322, 324, and 332), teleprotection relay(s) (e.g., teleprotection relay 326), communication processor(s) (e.g., comm. processor 314), bay controller(s) (e.g., bay controller 316), merging unit(s) (MUs) (e.g., MU 330), etc.

Human-machine interfaces (HMIs)—these devices may take the form of terminals or other user interface devices that allow a user to interact with power utility automation network 300 such as by monitoring the operation of the substation, issuing commands, changing parameters, and the like. For instance, power utility automation network 300 may include HMI 352.

Other sensors—power utility automation network 300 may also include other sensors, such as sensor 340, that are to capture further sensor data such as, but not limited to, temperature, humidity, audio and/or video, etc., and may be connected to power utility automation network 300 by hardwired I/O 328.

As noted above, a key observation is that substation networks and other power utility automation networks largely rely on standards for their designs and configurations. Among these standards is IEC 61850, which standardizes how the components of a substation network, such as power utility automation network 300 can be represented and configured. The data model of IEC 61850 also supports mappings to the Manufacturing Message Specification (MMS) protocol, the Generic Object Oriented Substation Event (GOOSE) protocol, the Sampled Measured Values (SMV) protocol, as well as Web Services.

IEC 61850 also specifies the System Configuration Description Language (SCL), which was previously known as the 'Substation Configuration description Language,' and retains the same acronym, SCL. In general, SCL is used as a standardized format to describe the components of a substation and their data communications, including both physical and logical nodes of the network. More specifically, a typical SCL file takes the form of an Extensible Markup Language (XML) file that includes any or all of the following sections:

Header—this section of an SCL file indicates the basic details of the SCL file itself and version information. For instance, an SCL header may look similar to the following:

<Header id="Plateforme_CISCO" nameStructure="IEDName" revision="R001" toolID="ABCDE" version="V0">

```
<History>
  <Hitem revision="R001" version="V0" what="History file
    created" when="Tue Jun 23 14:46:24 CEST 2020" who="System"
    why="History reset"/>
  </History>
</Header>
```

Substation—this section defines the different components of the substation (e.g., its logical and physical nodes), as well as their interconnections. An example Substation header may look similar to the following:

```
<Substation>
  <VoltageLevel Ref="E1">
    <Bay Ref="Q1">
      <Bfunction Ref="">
        <Device Ref="QA1" Type="CBR">
          <Connection NodeRef="L1"/>
          <LNode Ref="1" LNClass="CSWI" />
        </Device>
      </Bfunction>
      ...
    </Bay>
  </VoltageLevel>
</Substation>
```

Communications—this section specifies the different access points for accessing the different IEDs of the substation. For instance, a Communications header may look similar to the following:

```
<Communication>
  <SubNetwork name="WA1" type="8-MMS">
    <ConnectedAP apName="P1" iedName="J01_F301">
      <Address>
        <P xsi:type="tP_IP" type="IP">192.168.10.2</P>
        <P type="OSI-AP-Title">1,3,9999,23</P>
        <P xsi:type="tP_IP-SUBNET" type="IP-
          SUBNET">255.255.255.0</P>
        <P xsi:type="tP_IP-GATEWAY" type="IP-
          GATEWAY">0.0.0.0</P>
        <P type="OSI-AE-Qualifier">23</P>
        <P xsi:type="tP_OSI-PSEL" type="OSI-
          PSEL">00000001</P>
        <P xsi:type="tP_OSI-SSEL" type="OSI-SSEL">0001</P>
        <P xsi:type="tP_OSI-TSEL" type="OSI-TSEL">0001</P>
      </Address>
    </ConnectedAP>
    ...
  </SubNetwork>
```

IED—this section describes the configuration of an IED, such as the access points of the IED, any logical devices/nodes of the IED, and the like. It may also specify the data that the IED reports as Generic Substation Events (GSEs) and the data that the IED is configured to receive. For instance, an IED header may look similar to the following:

```
<IED desc="EASERGY P5F30" configVersion="0.0.1"
manufacturer="ACME MFG" originalSclRevision="B"
originalSclVersion="2007" type="Easergy P5" name="J01_F301">
  <Private type="ACME-MFG-IED-Type">P53</Private>
  <Private type="ACME-MFG-IEDP5x-OrderingCode">
    <OrderingCode
xmlns="http://www.foo.test/IEC61850/XMLSchema">
      <Val>P5F30-AAxA-HxxxA-xxxx</Val>
    </OrderingCode>
  </Private>
  <Services nameLength="64">
```

```
<DynAssociation max="8"/>
<SettingGroups/>
<GetDirectory/>
...
<AccessPoint name="P1">
  <Server>
    <Private type="ACME-MFG-IEDP5x-GOOSE">
      <GooseReceive
xmlns="http://www.foo.test/IEC61850/XMLSchema">
        <NIx max="128">
<!--<NI id="ExtRef ordering value" initialValue="Last / On / Off"
ref="IntAdd reference value: NIx" AttIndex="int" BitIndex="int"/>-->
<!--<NI id="x" initialValue="Last" ref="NIx" AttIndex="0"
BitIndex="0"/>-->
          <NI AttIndex="0" BitIndex="0" id="1" initialValue="Last"
ref="NI1"/>
...
```

DataTypeTemplates—this section defines the logical devices/nodes, etc. of the substation. For instance, this heading may look similar to the following:

```
<DataTypeTemplates>
  <LNodeType id="lphd_7_410_B2007" iedType="hmi"
    lnClass="LPHD">
    <DO desc="IEC61850_7_4.LogicalNodes.LNGroupL.LPHD.NamPlt"
name="NamPlt" type="LPL" transient="false"/>
    <DO desc="IEC61850_7_4.LogicalNodes.LNGroupL.LPHD.PhyNam"
name="PhyNam" type="DPL" transient="false"/>
    ...
  </LNodeType>
  ...
</DataTypeTemplates>
```

As would be appreciated, SCL files may fall into different categories/types, depending on their use. Their use of the above headers may also differ, depending on their category/type. For instance, SCL files are often grouped according to the following categories/types:

IED Capability Description (ICD) file—This type of SCL file specifies the complete capabilities of an IED. Communication and substation headers, for instance, are optional in this type of files.

System Specification Description (SSD) file—This type of SCL file specifies the details of the automation system of the substation. The IED header, for instance, is optional in this type of file.

Substation Configuration Description (SCD) file—This type of SCL file details the substation itself. In some instances, an SCD file can be viewed as a combination of an SSD file and any number of ICD files. In general, an SCD file describes the complete substation configuration using single line diagram connections to form a single line diagram, as well as the communication network and devices, and the IED configurations.

Configured IED Description (CID) file—This type of SCL file specifies the communications between an IED and an IED configuration system. This type of file is similar to an SCD file, but focused on a particular IED.

Instantiated IED Description (IID) file—This type of file defines the configuration of a single IED and is used to define the exchanges between the IED configuration system and a system configuration service.

System Exchange Description (SED) file—This type of file specifies the interfaces between projects.

Figure 4:
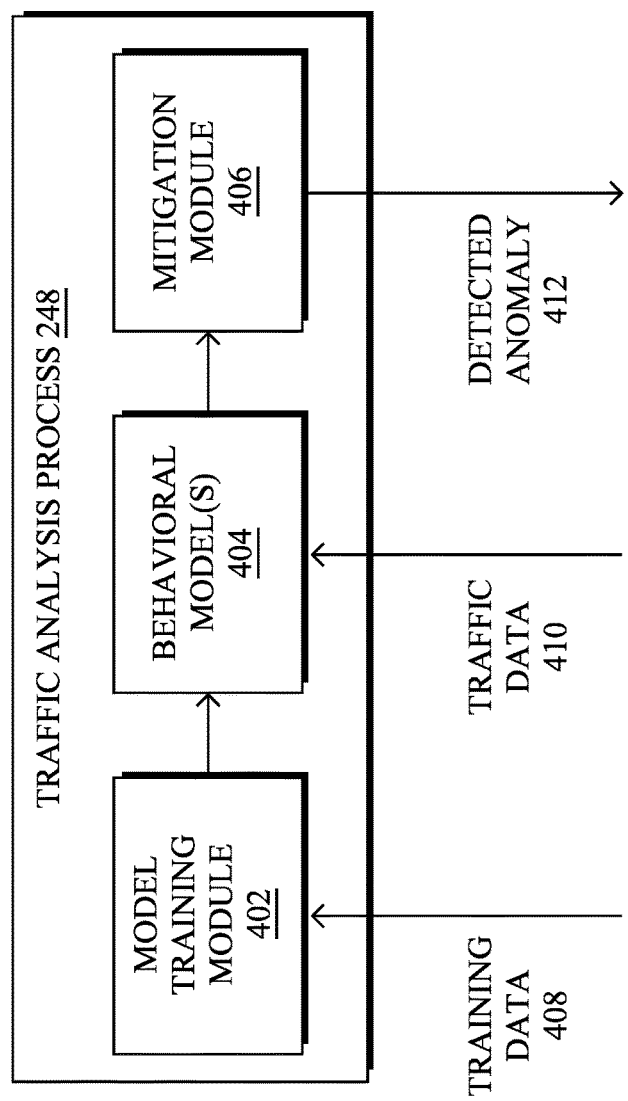
FIG. 4 illustrates an example architecture for a traffic analysis process.

FIG. 4 illustrates an example architecture 400 for a traffic analysis process 248, according to various embodiments. As shown, traffic analysis process 248 may include any or all of the following components: a model training module 402, one or more trained behavioral models 404, and/or a mitigation module 406. As would be appreciated, the functionalities of these components may be combined or omitted, as desired. In addition, these components may be implemented on a singular device or in a distributed manner. For instance, these components may be executed by a switch in the power utility automation network, a router in the power utility automation network, another device in communication therewith, or the like. In the distributed case, the combination of executing devices can be viewed as their own singular device for purposes of executing traffic analysis process 248.

In one embodiment, model training module 402 of traffic analysis process 248 may be configured to obtain training data 408 and, in turn, train one or more behavioral models 404. For instance, model training module 402 may receive training data 408 on a pull basis (e.g., in response to sending a request for the data) and/or on a push basis (e.g., without first requesting the data). In general, training data 408 is indicative of the normal behaviors of a power utility automation network, thereby allowing model training module 402 to train a behavioral model of the network that can be used to identify anomalous behaviors.

According to various embodiments, training data 408 may include traffic data regarding traffic in the power utility automation network. For instance, training data 408 may include general network traffic information from a network manager, switch configuration management information bases (MIBs), or the like. In some embodiments, the traffic data may also include telemetry data captured regarding existing traffic in the network. For example, an intermediate networking device located along a path in the network (e.g., a switch 306 or switch 310 in FIG. 3), or another device in communication therewith, may analyze packets flowing through the networking device and include the resulting data in training data 408. In turn, the analyzing device may include information regarding the headers of the packets (e.g., source address and/or port, destination address and/or port, protocol information, timing information, etc.) in training data 408. In further cases, the analyzing device may employ deep packet inspection (DPI), to also extract information from the payloads of the packets for inclusion in training data 408. Additional information that can be captured about the traffic for inclusion in training data 408 may take the form of traffic statistics or other computed metrics, such as the start time, end time, duration, packet size(s), and/or the distribution of bytes within a traffic flow.

According to various embodiments, training data 408 may also include one or more SCL files regarding the power utility automation network. As noted above, substations typically have one or more associated SCL files that describe their components, layouts, and communications. For instance, training data 408 may include an SCD file that specifies the configuration for the substation, one or more ICD files that configure the IED(s) of the substation, and/or other SCL files that may include information that could be used to infer the expected traffic of the power utility automation network.

In further embodiments, training data 408 may further include other protocol information, such as information regarding the use of other automation and control protocol traffic. For instance, training data 408 may include data regarding Tele-Control based on the 104-Protocol, OPC Unified Architecture (UA), Web Services, GOOSE, SMV, Web Services, or the like. In yet another embodiment, training data 408 may include time synchronization traffic information, such as information regarding the use of the Precision Time Protocol (PTP) in the power utility automation network.

In additional embodiments, the traffic data in training data 408 may be partially or fully synthetic traffic data. In this context, "synthetic" traffic data refers to traffic data regarding the power utility automation network that was not actually observed in that network. For instance, synthetic traffic data may be generated using a simulator for the network based on a known configuration of the network (e.g., from the SCL files, etc.). Indeed, once the configuration of the network is known, certain traffic between endpoint can be expected and simulated. In further cases, the synthetic traffic data can also be generated based in part on traffic data obtained from other networks. Advantageously, using synthetic traffic data in training data 408 allows the system to quickly train a behavioral model for the network by either reducing or eliminating the amount of time needed to observe the traffic data in the actual network.

In other words, model training module 402 may train a behavioral model 404 based on training data 408 that is indicative of the traffic behavior in the network (e.g., in terms of volume/number of packets, time stamps, etc.), as well as the SCL file(s) that describe the power utility automation network. By enriching the model training using these types of files, the resulting behavioral model(s) 404 will also take into account the subnetwork definitions of the network, access point definitions of the network, IED addresses, bridge port and virtual LAN (VLAN) definitions, redundancy information (e.g., based on protocols such as PRP, HSR, etc.), and/or protocol-based communications (e.g., GOOSE. MMS, SMV, etc.). These definitions provide a complete picture for the behavioral model 404.

In general, the one or more behavioral models 404 may take the form of an anomaly detection model trained to detect anomalous behaviors in the power utility automation network. For instance, a behavioral model 404 may comprise a trained decision tree (e.g., a random forest classifier, etc.), neural network-based classifier, or other machine learning model that takes as input traffic data 410 regarding traffic in the network and flag traffic behaviors that are anomalous. Traffic data 410 may include, for instance, traffic telemetry regarding the traffic flows of the power utility automation network, such as their sources and destinations, packet information, etc.

Once trained, traffic analysis process 248 may initiate use of the behavioral model(s) 404 in the power utility automation network to identify anomalous traffic behavior in the power utility automation network. If, for instance, traffic analysis process 248 is a router, switch, or other networking device in the network, it may activate the behavioral model(s) 404 and begin analyzing its captured traffic data 410. However, further embodiments also provide for remote training of the behavioral model(s) 404. In such remote cases, the behavioral model(s) 404 may be deployed to a networking device in the network for execution (e.g., by a router, switch, etc.).

By way of example, behavioral model(s) 404 may deem a traffic flow to be anomalous if the flow is between devices or other endpoints that would not be expected to communicate with one another, the traffic flow does not conform to its expected characteristics in terms of timing, size, etc., or the like. In other words, behavioral model(s) 404 may model the intents of the devices and other endpoints of the power utility automation network (e.g., IEDs, controllers. PMUs, etc.), so that it can flag any anomalous behaviors that they exhibit on the network.

If a behavioral model 404 determines that a behavioral anomaly exists in the power utility automation network, it may notify mitigation module 406 which, in turn, initiates one or more mitigation actions. Typically, mitigation module 406 will mitigate the anomaly by providing an alert regarding the detected anomaly 412 to a user interface and/or other devices associated with the power utility automation network. However, further mitigation actions may also entail mitigation module 406 triggering automated actions, such as blocking traffic, triggering packet captures, etc.

The training of the behavioral model(s) 404 by model training module 402 may also be repeated over time, so as to refine the behavioral model(s) 404, in some embodiments. This allows traffic analysis process 248 to learn over time the traffic patterns, device relationships, paths, connections, cycles related to end nodes (devices), etc. of the power utility automation network. Model training module 402 may initiate retraining on demand (e.g., in response to a user request), periodically, at other scheduled times, or even in response to feedback regarding the performance of the behavioral model(s) 404. For instance, if a user deems one or more of the detected anomalies 412

Figure 5:
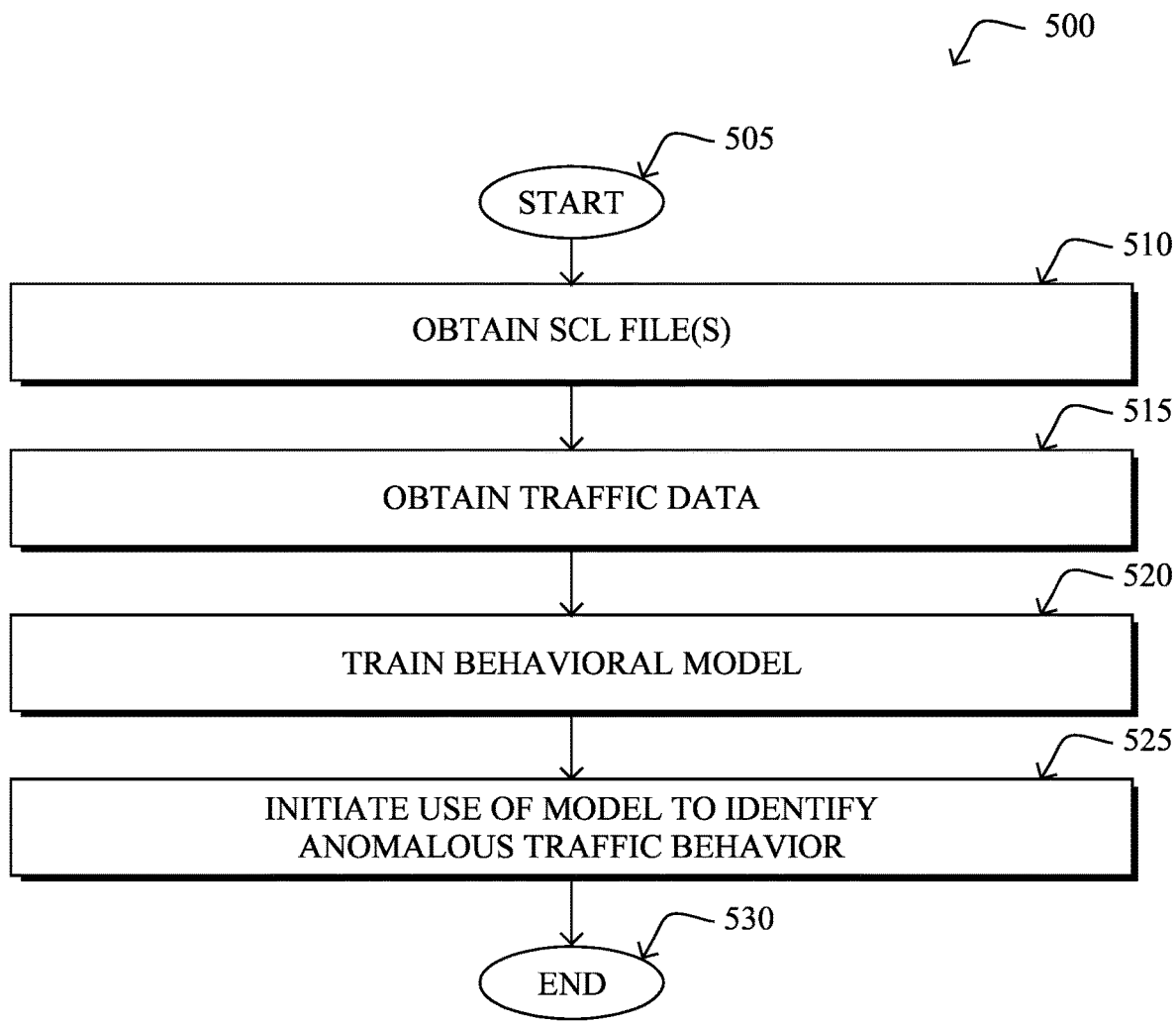
FIG. 5 illustrates an example simplified procedure for behavioral modeling of traffic in a power utility automation network.

FIG. 5 illustrates an example simplified procedure for behavioral modeling of traffic in a power utility automation network, in accordance with one or more embodiments described herein. In various embodiments, a non-generic, specifically configured device (e.g., device 200), such as a network switch, router, security appliance, or other device in communication therewith, may perform procedure 500 by executing stored instructions (e.g., process 248). The procedure 500 may start at step 505, and continues to step 510, where, as described in greater detail above, the device may obtain one or more System Configuration Description Language (SCL) files regarding a power utility automation network. For instance, the one or more SCL files may include an Intelligent Electronic Device (IED) Capacity Description (ICD) file, an Substation Configuration Description (SCD) file, and/or any other form of SCL file.

As step 515, as described in greater detail above, the device may obtain traffic data regarding traffic in the power utility automation network. For instance, the traffic data may indicate traffic patterns between two endpoints in the network, such as when the traffic is sent, characteristics of the traffic (e.g., the protocol used, packet size information, header information, etc.), and the like. In one embodiment, the traffic data may be indicative of Precision Time Protocol (PTP) traffic in the power utility automation network.

At step 520, the device may train, using the one or more SCL files and the traffic data, a behavioral model for the network that models traffic in the network, as described in greater detail above. In some embodiments, the behavioral model may be a machine learning-based model, such as a decision tree classifier (e.g., random forest, etc.), neural network-based classifier, or the like. In various embodiments, the device may train the behavioral model based further on other automation and control protocol information, such as OPC UA data associated with the network, tele-control data, web service data, or the like.

At step 525, as detailed above, the device may initiate use of the behavioral model in the power utility automation network to identify anomalous traffic behavior in the power utility automation network. In some embodiments, the device itself may use the behavioral model to identify anomalous traffic behavior, such as when the device is a switch, router, or other networking device in the network. In other embodiments, the device may deploy the behavioral model to such a networking device. When the behavioral model identifies a behavioral anomaly in the network, it may trigger a mitigation action such as sending an alert or the like. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce cybersecurity mechanisms for a power utility automation network, such as those found in power substations. In particular, the techniques herein allow for the behavioral modeling of a power utility automation network by leveraging the file(s) typical for these types of networks that define the configurations, device definitions, etc. for the network. In doing so, the resulting behavioral model is able to identify new forms of cybersecurity threats to the network that result in anomalous behavior in the network (e.g., unexpected traffic flows between two endpoints, traffic flows that do not conform to their expected characteristics, etc.).

While there have been shown and described illustrative embodiments for performing behavioral modeling in a power utility automation network, it is to be understood that various other adaptations and modifications may be made within the intent and scope of the embodiments herein. For example, while certain protocols are described herein, such as IEC 61850, the techniques herein are not limited as such and can be applied to operate in conjunction with any number of other protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    obtaining, by a device, one or more System Configuration Description Language files regarding a power utility automation network;
    obtaining, by the device, training data and traffic data regarding traffic in the power utility automation network, wherein the training data comprises information that is extracted using deep packet inspection from network packets routed through the power utility automation network, further wherein the traffic data comprises synthetic traffic data generated by simulation of the power utility automation network;
    training, by the device and using the one or more System Configuration Description Language files, the training data and the traffic data, a machine learning-based behavioral model for the power utility automation network that models traffic in the power utility automation network; and initiating, by the device, use of the behavioral model in the power utility automation network to identify anomalous traffic behavior in the power utility automation network.

2. The method as in claim 1, wherein the behavioral model generates and sends an alert, when it identifies anomalous traffic behavior in the power utility automation network.

3. The method as in claim 1, wherein the one or more System Configuration Description Language files regarding the power utility automation network comprise an Intelligent Electronic Device (IED) Capacity Description (ICD) file.

4. The method as in claim 1, wherein the traffic data is indicative of Precision Time Protocol (PTP) traffic in the power utility automation network.

5. The method as in claim 1, wherein the one or more System Configuration Description Language files regarding the power utility automation network comprise a Substation Configuration Description (SCD) file.

6. The method as in claim 1, further comprising:
obtaining, by the device, OPC Unified Architecture (UA) data associated with the power utility automation network, wherein the device trains the behavioral model based further in part on this data.

7. The method as in claim 1, wherein the device comprises a switch, security apparatus, or router in the power utility automation network.

8. The method as in claim 1, wherein initiating use of the behavioral model in the power utility automation network to identify anomalous traffic behavior in the power utility automation network comprises:
deploying the behavioral model to a switch, security apparatus, or router in the power utility automation network.

9. The method as in claim 1, wherein the power utility automation network comprises one or more of: a phasor measurement unit (PMU) or a protection relay.

10. The method as in claim 1, wherein the one or more System Configuration Description Language files regarding the power utility automation network specify one or more of: a subnetwork definition, an access point definition, address information, or a protocol used by the traffic.

11. An apparatus, comprising:
one or more interfaces;
a processor coupled to the one or more interfaces and configured to execute one or more processes; and
a memory configured to store a process that is executable by the processor, the process when executed configured to:
obtain one or more System Configuration Description Language files regarding a power utility automation network;
obtain training data and traffic data regarding traffic in the power utility automation network, wherein the training data comprises information that is extracted using deep packet inspection from network packets routed through the power utility automation network, further wherein the traffic data comprises synthetic traffic data generated by simulation of the power utility automation network;
train, using the one or more System Configuration Description Language files, the training data and the traffic data, a machine learning-based behavioral model for the power utility automation network that models traffic in the power utility automation network; and
initiate use of the behavioral model in the power utility automation network to identify anomalous traffic behavior in the power utility automation network.

12. The apparatus as in claim 11, wherein the behavioral model generates and sends an alert, when it identifies anomalous traffic behavior in the power utility automation network.

13. The apparatus as in claim 11, wherein the one or more System Configuration Description Language files regarding the power utility automation network comprise an Intelligent Electronic Device (IED) Capacity Description (ICD) file.

14. The apparatus as in claim 11, wherein the traffic data is indicative of Precision Time Protocol (PTP) traffic in the power utility automation network.

15. The apparatus as in claim 11, wherein the one or more System Configuration Description Language files regarding the power utility automation network comprise a Substation Configuration Description (SCD) file.

16. The apparatus as in claim 11, wherein the process when executed is further configured to:
obtain OPC Unified Architecture (UA) data associated with the power utility automation network, wherein the apparatus trains the behavioral model based further in part on this data.

17. The apparatus as in claim 11, wherein the apparatus comprises a switch, security device, or router in the power utility automation network.

18. The apparatus as in claim 11, wherein the apparatus initiates use of the behavioral model in the power utility automation network to identify anomalous traffic behavior in the power utility automation network by:
deploying the behavioral model to a switch, security device, or router in the power utility automation network.

19. A tangible, non-transitory, computer-readable medium storing program instructions that cause a device to execute a process comprising:
obtaining, by the device, one or more System Configuration Description Language files regarding a power utility automation network;
obtaining, by the device, training data and traffic data regarding traffic in the power utility automation network, wherein the training data comprises information that is extracted using deep packet inspection from network packets routed through the power utility automation network, further wherein the traffic data comprises synthetic traffic data generated by simulation of the power utility automation network;
training, by the device and using the one or more System Configuration Description Language files, the training data and the traffic data, a machine learning-based behavioral model for the power utility automation network that models traffic in the power utility automation network; and
initiating, by the device, use of the behavioral model in the power utility automation network to identify anomalous traffic behavior in the power utility automation network.

* * * * *